March 28, 1944.　　　L. B. WILLOUGHBY　　　2,345,310
ARTICLE ASSEMBLING AND FEEDING MACHINE
Original Filed Aug. 12, 1940　　4 Sheets-Sheet 1

INVENTOR:
Lively B. Willoughby
By Dowell & Dowell
ATTORNEYS

March 28, 1944.   L. B. WILLOUGHBY   2,345,310
ARTICLE ASSEMBLING AND FEEDING MACHINE
Original Filed Aug. 12, 1940    4 Sheets-Sheet 3
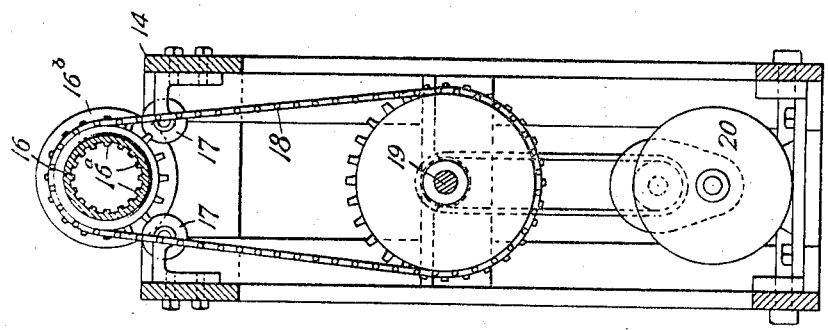
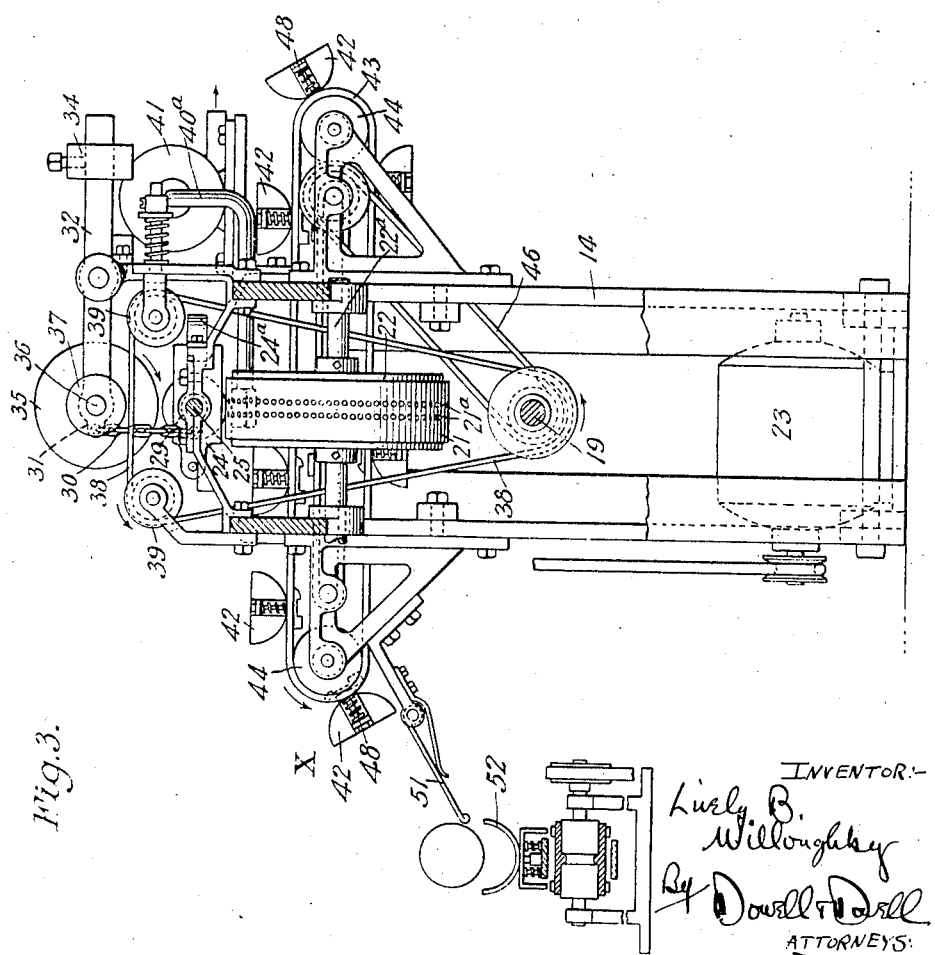

March 28, 1944.    L. B. WILLOUGHBY    2,345,310
ARTICLE ASSEMBLING AND FEEDING MACHINE
Original Filed Aug. 12, 1940    4 Sheets-Sheet 4

INVENTOR:-
Lively B. Willoughby
By Dowell & Dowell
ATTORNEYS:

Patented Mar. 28, 1944

2,345,310

UNITED STATES PATENT OFFICE 2,345,310

ARTICLE ASSEMBLING AND FEEDING MACHINE

Lively B. Willoughby, Louisville, Ky., assignor to Ballard & Ballard Company, Incorporated, Louisville, Ky., a corporation of Kentucky Original application August 12, 1940, Serial No. 352,341, now Patent No. 2,313,706, dated March 9, 1943. Divided and this application June 12, 1942, Serial No. 446,760

15 Claims. (Cl. 198—35)

This invention relates to article packaging machines and more particularly to machines for stacking and dispensably feeding articles in packagable unit groups for packaging or preparatory wrapping, having reference to articles of cake or wafer form such as biscuits, candy slices and other bakery or confectionery manufactures, and the like.

The present application is a division of my copending application Serial No. 352,341, filed August 12, 1940, and issued March 9, 1943, as Patent No. 2,313,706.

An object of the invention is to provide a machine especially adapted to feed stacked groups of uncooked dough cakes to a place or to another machine for protective wrapping preliminary to packaging or sealing in cans, having reference in particular to the packaged biscuit product of my prior U. S. Reissue Patent No. 18,426, dated April 19, 1932. This object however is not intended to be limited to said product or to the handling of uncooked dough alone and in a broader sense contemplates application to the feed of various other products intended to be wrapped in stacked unit groups.

Another object is to automatically arrange and deliver unit groups of the articles in the desired uniform number for wrapping or packaging and to provide for any variation of number in such groups that may be desired.

A further object is to provide such a machine capable of rapid operation conformable to the rate of plant production and which is relatively simple in construction as well as economic in purchase and maintenance cost, the same being designed to supplant or replace manual handling or gathering and stacking into wrappable unit groups.

Other objects will be hereinafter set forth and the complete concept of the invention will be better understood from the following description made with reference to the attached drawings, which illustrate one practical embodiment of the invention in a very simple mechanical organization.

In said drawings:

Fig. 3 is a vertical sectional view taken on the line 3—3 of Fig. 1, looking in the direction of the arrows;

Fig. 4 is a vertical sectional view taken on the line 4—4 of Fig. 1, looking in the direction of the arrows;

Figure 1:
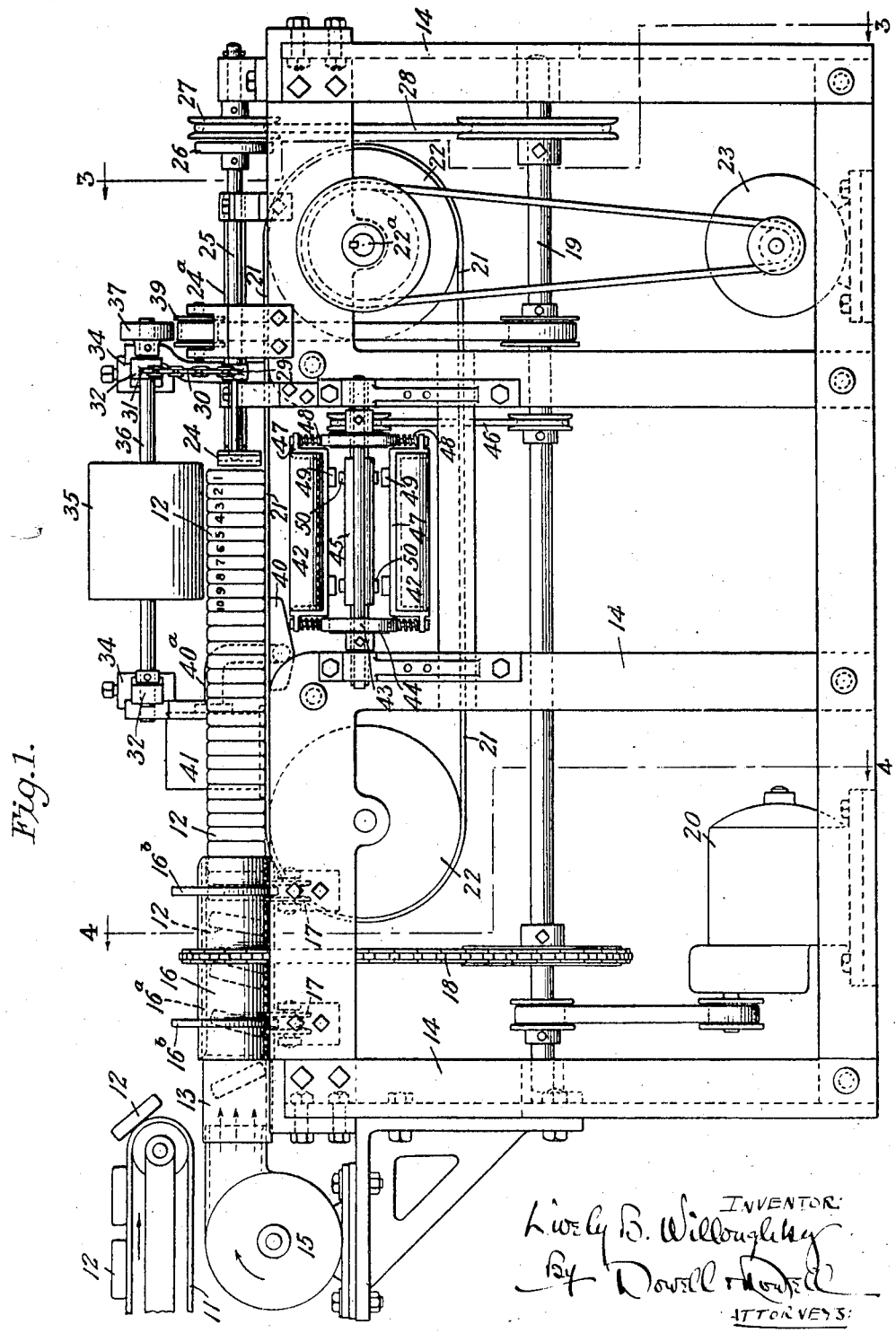
Fig. 1 is a side elevation of the illustrative embodiment.

Referring first of Fig. 1, an endless conveyor 11 is shown delivering the articles 12, consisting in this instance of fresh dough biscuits from a rolling and cutting machine, in continuous succession into a hopper 13 at one end of a machine table 14. Said hopper has a blower 15 connected with its forward side and as the articles are dropped thereinto the blast from said blower impels them immediately through its opposite discharge into and progressively through a posturing cylinder 16. This cylinder comprises a rotated member having internal longitudinal ribbing 16a (see Fig. 4), serving to position the articles on edge erect as they pass therethrough under the blower force. It is advantageously "float" supported upon cradling rollers 17 through annular bearing and guide flanges 16b and is rotated by a driven sprocket chain 18 from the main driving shaft 19 which is in turn driven by the motor 20, the said shaft and motor and the said cradling rollers being of course suitably supported on the machine table.

As the articles 12 drop from belt 11 into hopper 13, the air blast from blower 15 blows same into the rotating cylinder 16. As the articles enter the cylinder their speed is retarded in the direction of blowing and at the same time the ribs 16a contact the articles and the two forces acting upon the articles start the articles rotating under gyratory action on edge since same are being simultaneously rotated and blown within cylinder 16. As each article proceeds through the cylinder 16 it is pushed into contact with the preceding article therein previously disposed adjacent the outer end of the cylinder. After about three or four such articles have been accumulated within the cylinder, they emerge therefrom onto the belt 21 underneath cylinder 16 and are carried away thereon as fast as subsequent articles 12 are fed into cylinder 16. The longitudinal ribs 16a within cylinder 16 permit escapement of some of the air from blower 15 around the peripheries of articles 12 within the cylinder, and said ribs 16a furthermore reduce a substantial amount of friction between the articles and walls of cylinder 16 while the articles are being forced through the cylinder onto the conveyor belt 21. While the cylinder with the articles therein are rotating, the air blast from blower 15 behind the articles forces same forwardly along the longitudinal ribs 16, which forward movement could not be successfully effected if the cylinder had smooth surfaced inner walls since the air could not escape around the peripheries of the articles and the friction between the articles and the smooth sides of the cylinder would be so great that the forward movement of the articles while rotating with the cylinder would be stopped.

Figure 2:
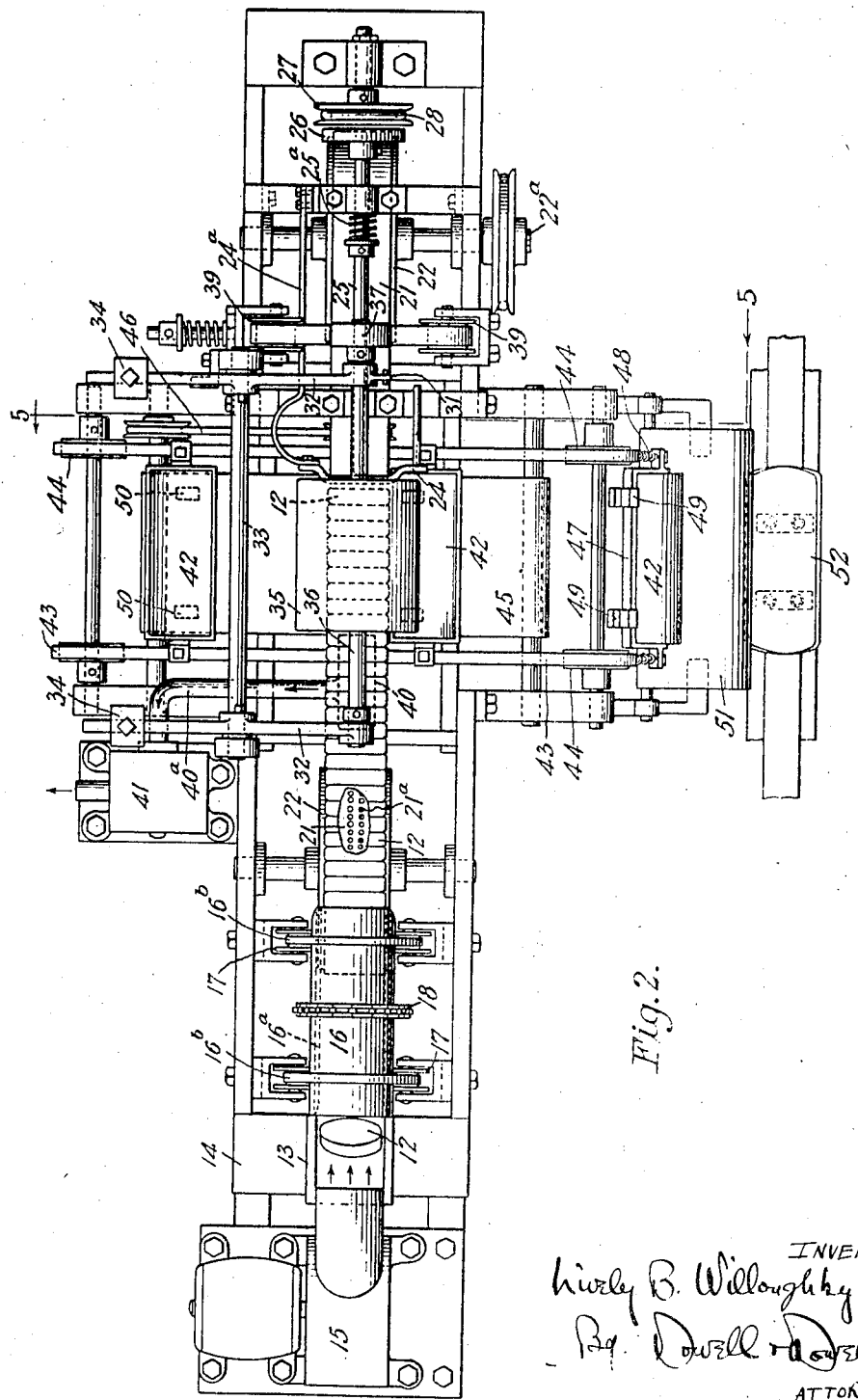
Fig. 2 is a top plan view of the same, omitting an associated element shown partially at the upper left of Fig. 1.

From the rearward end of said cylinder, the articles emerge upright onto a travelling endless carrier belt 21, extended in the same direction and formed with a series of longitudinal perforations 21a (see Figs. 2 and 3). This belt is trained over supporting pulleys 22, supported in the table, and is separately driven as by a second motor 23 through belting or the equivalent connection with one of said pulleys or with the supporting shaft 22a thereof. On said belt 21, the articles build up or accumulate side-by-side in a stacked column as shown, overlying the perforations 21a therein, as the same moves rearwardly in a continuous progression synchronized with the rate of article delivery to and through the posturing cylinder. Feeding thus in a continuous column extruding from the cylinder, these articles mutually tend to hold one another erect and compress sidewise against each other.

Figure 6:
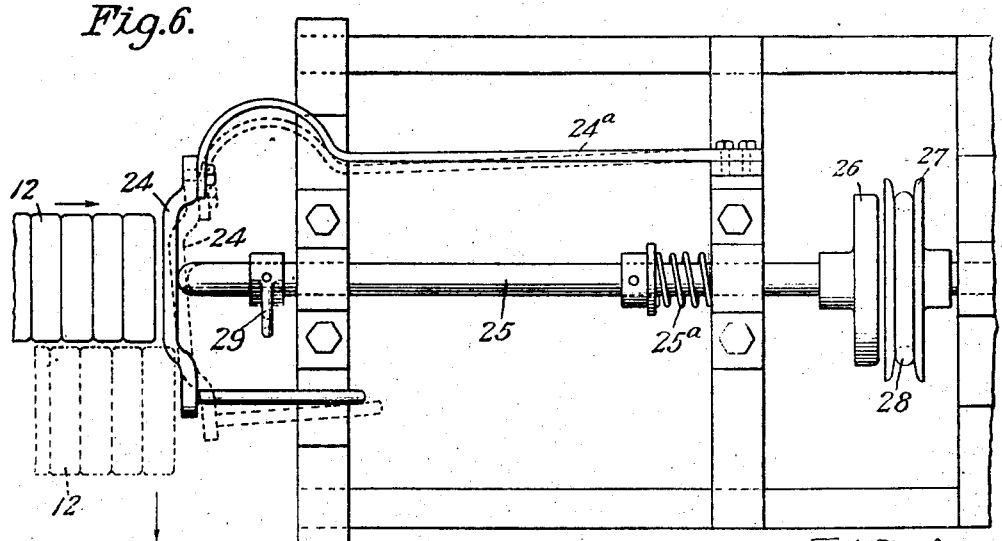
Fig. 6 is an enlarged detail view of a part of the assembly somewhat obscured in the plan of Fig. 2.

Advancing with the belt, the leading article 12 of the column comes at a predetermined point into pressure contact against a barrier plate 24. This plate is carried by a spring-arm 24a (see Figs. 2 and 6) supported upon the table structure, which yields sufficiently for the plate to be repressed or deflected backward a short distance as indicated by the dotted line positioning of Fig. 6. As it is repressed by force of the advancing column thereagainst said plate in turn presses against one end of a rocking shaft 25 (see Fig. 6) and represses or slides the latter a short distance rearward against the tension of a return spring 25a. This rocking shaft carries a friction disc 26 on its opposite end which, upon its repression or rearward shift, is brought into contact with a cooperating continuously rotating friction wheel 27 driven as by a pulley-belt 28 from the main driving shaft 19. Contact between these two friction members causes said shaft to rock or rotate only partially in the actuated direction, said members having only a light frictional contact with each other adapting the first to ready slippage against the second under sufficient resistance to complete rotation. An arm 29 on the shaft connects by chain or other link 30 with a similar arm 31 on one of a parallel pair of rocking levers 32 (see Fig. 3) intermediately pivoted and secured to a common shaft 33 thereabove and rocks said levers downward against counterbalance weights 34 thereon, as it is itself rocked by engagement of the two friction members.

Said levers form a carriage for a roller 35 rotatable therebetween on a shaft 36 above the advanced column of articles. This roller is of a length equal to the extent or number of the stacked articles desired to be included in the unit groups to be packaged—which number consists of ten in this instance—and is disposed on its said shaft so as exactly to overlie the said extent or number of articles when the advancing column thereof has moved fully against the barrier plate 24 (note Fig. 1). The aforesaid shaft 36 thereof carries on one end a wheel 37 which contacts an endless driving belt 38 between a pair of pulleys 39 (see Fig. 3) when it is swung downward with rocking of the levers 32, the said belt being trained over said pulleys, one of which functions as a tightener, and being driven from the main driving shaft. Swinging downward, with simultaneous rotation imparted from said belt, upon rocking of the levers as stated to the position indicated by dotted lines in Fig. 5, said roller frictionally engages and thereby rolls the predetermined group number of articles sidewise off the travelling carrier belt 21 into a receiver, later described, therebelow. Thereupon, pressure is released from the barrier plate 24 and said plate, the rocking shaft 25, and the rocking levers 32 carrying the roller 35 return to initial position ready for the next actuation on advance of the article column again to press against said barrier plate. This operative cycle is repeated successively with each unit or group discharge of the articles, the speed being governed or restricted solely by the rate of article feed in column formation.

To ensure against the discharge of more than the intended group number of articles, at any time, a suction box 40 is provided (see Figs. 2 and 3) under the carrier belt 21, over which the latter supportively moves with its perforations 21a exposed direct to the action thereof. This box extends lengthwise of the belt sufficient to act through said perforations upon several of the articles adjacent to the group to be removed, or rearwardly to a point underlying the one—being the eleventh in this instance—next adjacent to the last of a group being removed which will be the first of the group next to be removed. Suction applied to the several articles adjacent to the group actually being rolled off the carrier belt keeps any articles subject to said suction from being drawn off by facial rub or cohesion by the group being removed. Said box is maintained under suction by a suction blower or pump 41 connected therewith by pipe 40a.

Figure 5:
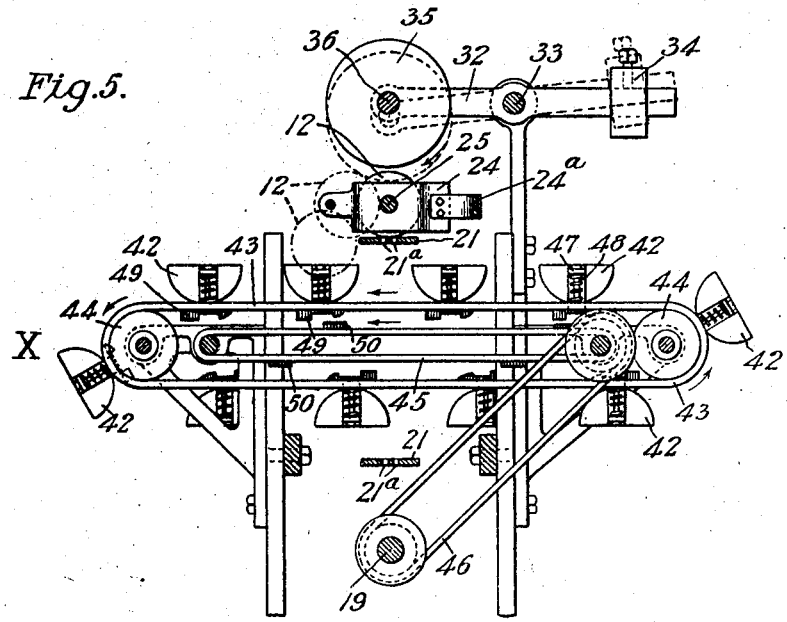
Fig. 5 is a section, broken partially away, taken on the line 5—5 of Fig. 2, looking in the direction of the arrows.

The groups of articles successively expunged from the carrier belt drop into a series of receiver trays 42 brought successively into a receiving position thereunder (see Figs. 3 and 5). These trays are carried by an endless conveyor 43 moving transversely of the table over pulleys 44 and driven in this instance by an inner paralleling endless drive member 45, which latter is in turn driven through belt 46 from the main driving shaft. Said trays in the illustrated driving arrangement are supported on their carrier upon upright bracket-guide bolts 47 against lifting springs 48 thereunder at opposite ends (see Fig. 5) and carry engagement plates 49 on their bottom sides. Under weight of the groups of articles dropped thereinto the trays depress against said lifting springs so as to bring said engagement plates thereon into engagement with or in opposition to push lugs or plates 50 on the inner endless drive member 45. Said push lugs or plates coming into engagement with said engagement plates drive the trays and their carrier forwardly so as to bring a successive tray into the receiving position. The trays thus moved successively forward to an inverting discharge position indicated at X eject the articles onto a spring-sustained chute or slide 51 delivering them into the receptice trays 52 of a conveyor to or forming part of an article wrapping machine, represented partially in Fig. 3.

It will be appreciated that this machine can be operated at any desired speed, depending upon the rate at which the articles to be stacked and delivered in group for wrapping are fed to and through the posturing cylinder onto the travelling carrier or column formation belt. It will also be noted that the articles are discharged and ejected from the machine only as the predetermined group number are accumulated and removed from said belt. There is no possibility of any overrunning, or feeding faster than the discharge, or vice versa. The removing or engaging roller 35 is positively operated every time the intended group number of articles is brought thereunder into pressure against the barrier plate 24 and a certain interval is required to refill the vacancy resulting from the removal or expulsion of said number. The parts operating in this function rapidly return to initial or normal position and are ready always to operate for the expulsion when column pressure is applied to said barrier plate. Thus, the speed or rate of operation is governed entirely by the rate of article accumulation or column formation upon the carrier belt bringing them rearwardly under the removing roller poised to eject the predetermined number in group from the machine.

The advantages of this invention and the machine it provides will be appreciated. It fills a need in the baking industry, especially in plants where fresh dough or the like product is to be packaged or canned in grouped number or stacked relation. Such a need has long been felt by bakers and confectioners alike, who desire to employ machinery for the dual purpose of eliminating hand contact and manipulation and to substitute machinery for such manual labor. Although designed particularly for use in connection with fresh or unbaked dough, or unbaked dough biscuits such as the product of my aforementioned Reissue Patent No. 18,426, it is obviously applicable to any other product or manufacture such as candy, cooked cakes, fresh pineapple slices and the like.

Various changes can of course be made in the construction of the machine and in the form and arrangement of its several component parts within the broad scope and spirit of the invention and without exceeding the actual comprehensibility thereof. Therefore, it is not intended to limit the same by the appended claims to the specific construction, organization or arrangement shown and described, nor to otherwise impose any restrictions thereon beyond what said claims in their recited terms specifically impose or define.

Having thus described my invention, what I claim as new and desire to secure by Letters Patent of the United States is:

1. A machine for supplying articles in stacked relationship comprising, in combination, a hopper into which the articles are successively dropped; a blower by which the successively dropped articles are successively blown broadside; a rotated hollow member into and through which the articles expelled from the hopper are successively driven under action of said blower into forced positioning on edge; and an endless carrier onto which the articles from said member are successively fed on edge side by side in a continuously forming and advancing stacked column.

2. In a machine as set forth in claim 1, said hopper being trough-shaped and disposed between the blower and member in alignment with the axis of the blower outlet and the axis of the hollow member.

3. A machine for supplying articles in stacked relationship comprising, in combination, a hopper into which the articles are successively dropped; a blower by which the successively dropped articles are successively blown broadside; a rotatable cylinder into and through which the articles expelled from the hopper are successively driven under action of said blower into forced positioning on edge, said cylinder having external annular bearing flanges; cradling rollers engaging said flanges; means for rotating said cylinder; and an endless carrier onto which the articles from said cylinder are successively fed on edge side by side in a continuously forming and advancing stacked column.

4. In a machine as set forth in claim 3, said hopper being trough-shaped and disposed between the blower and cylinder in alignment with the axes of the blower outlet and cylinder.

5. A machine for supplying articles in stacked relationship comprising, in combination, a hopper into which the articles are successively dropped; a blower by which the successively dropped articles are successively blown broadside; a rotatable cylinder into and through which the articles expelled from the hopper are successively driven under action of said blower into forced positioning on edge; said cylinder having longitudinally extending ribs on its inner wall engaging the peripheries of said articles passing therethrough to position same on edge therein; and an endless carrier onto which the articles from said cylinder are successively fed on edge side by side in a continuously forming and advancing stacked column.

6. In a machine as set forth in claim 5, said hopper being trough-shaped and disposed between the blower and cylinder in alignment with the axes of the blower outlet and cylinder.

7. A machine for supplying articles in stacked relationship comprising, in combination, a hopper into which the articles are successively dropped; a blower by which the successively dropped articles are successively blown broadside; a rotatable cylinder into and through which the articles expelled from the hopper are successively driven under action of said blower into forced positioning on edge; said cylinder having external annular bearing flanges; cradling rollers engaging said flanges; means for rotating the cylinder; said cylinder having longitudinally extending ribs on its inner wall engaging the peripheries of the articles passing therethrough to position the same on edge therein; and an endless carrier onto which the articles from said cylinder are successively fed on edge side by side in a continuously forming and advancing stacked column.

8. In a machine as set forth in claim 7, said means comprising a sprocket on said cylinder; a drive sprocket; a chain running around the said sprockets; and means for rotating the drive sprocket.

9. In combination, a hopper into which articles are successively dropped; a blower by which the successively dropped articles are successively blown broadside; a rotatable hollow member into and through which the articles expelled from the hopper are successively driven under action of said blower into forced positioning on edge; and a receiver into which the articles from said member are successively fed on edge side by side.

10. In a combination as set forth in claim 9, said hopper being trough-shaped and disposed between the blower and member in alignment with the axes of the blower outlet and member.

11. In a combination as set forth in claim 9, said hopper being trough-shaped and disposed between the blower and member in alignment with the axes of the blower outlet and member, and said receiver being aligned with the said member.

12. In a combination as set forth in claim 9, said member comprising a cylinder having external annular bearing flanges; cradling rollers engaging the flanges; and means for rotating the member.

13. In a combination as set forth in claim 9, said member having longitudinally extending ribs on its inner wall engaging the peripheries of said articles passing therethrough to position same on edge therein.

14. In a combination as set forth in claim 9, said member comprising a cylinder having external annular bearing flanges; cradling rollers engaging the flanges; a sprocket on said cylinder; a drive sprocket; a chain running around said sprockets; and means for rotating said drive sprocket.

15. In a combination as set forth in claim 9, said member comprising a cylinder having external annular bearing flanges; cradling rollers engaging the flanges; said member having longitudinally extending ribs on its inner wall engaging the peripheries of said articles passing therethrough to position same on edge therein; and means for rotating the cylinder.

LIVELY B. WILLOUGHBY.